3,171,751
REFRACTORIES WITH IMPROVED INTERMEDIATE TEMPERATURE STRENGTH
Roger W. Woodruff, Bethel Park, Pa., assignor to Harbison-Walker Refractories Company, Pittsburgh, Pa., a corporation of Pennsylvania
No Drawing. Filed Oct. 8, 1962, Ser. No. 229,202
6 Claims. (Cl. 106—58)

This invention relates to improved refractory shapes and more particularly to improved, unburned, chemically bonded basic refractory brick having improved low and intermediate temperature strength.

Refractory shapes may be termed chemically bonded or ceramically bonded. The chemically bonded shapes are green or unfired shapes, and are put into service in this form. Ceramically bonded shapes are shapes which have been subjected to elevated burning or firing temperatures to obtain a ceramic bond through the particulate matter which makes up the shape. This invention is directed to the chemically bonded-type of refractory shape.

It is desirable that chemically bonded shapes have relatively high green strength upon drying in order to facilitate subsequent storage, shipping and commensurate handling. Also, particularly during initial heat-up of the installation, in which chemically bonded brick are installed, it is desirable that the chemical bond have sufficient strength through intermediate temperature ranges, i.e. about 1500° F., as to resist the tendency of the brick to weaken and crumble.

Many and varied techniques and brick batch additives have been suggested to improve low and intermediate temperature strength in chemically bonded refractory brick. The literature, particularly the patent literature, is replete with the foregoing. While these techniques and additives have been satisfactory in some aspects and in some service environments, the refractories technologists have continued their search for improved low and intermediate temperature strength in chemically bonded brick. One difficulty with certain prior additives has been the evolution of noxious fumes upon heating. A particularly distressing characteristic of many of the prior additives has been the poisonous character of evolving fumes.

Accordingly, it is an object of this invention to provide improved unburned refractory shapes. It is another object of this invention to provide improved chemically bonded basic refractory shapes. And it is yet another object of this invention to provide chemically bonded basic refractory shapes having improved low and intermediate temperature strength.

Briefly, according to one embodiment of the invention, a small and stringently controlled amount of molybdenite is added to a size graded basic brick batch. The preferred molybdenite is a platy material which serves to lubricate the brick batch ingredients during pressing to obtain increased green density and strength at the press. Through intermediate temperature ranges, the molybdenite also serves to provide increased strength.

The following examples, given by way of explanation and not limitation, more clearly point out the advantages of this invention.

*Example I*

A size graded brick batch was prepared consisting substantially entirely of dead burned magnesite grain. The size grading of the magnesite was about 20% held on a 10 mesh screen, about 30% passing a 10 mesh screen and held on a 28 mesh screen, about 10% passing a 28 mesh screen and held on a 65 mesh screen, with the remaining 40% passing a 65 mesh screen. A major portion, i.e. over 50%, of the —65 mesh fraction passed a 150 mesh screen. A typical analysis, by weight and on the basis of an oxide analysis, of the magnesite was about 98% MgO with the other 2% being $Al_2O_3$, $Fe_2O_3$, and $SiO_2$.

Ninety-nine parts of the foregoing size graded magnesite brick batch were mixed with about 1 part, by weight, of finely divided molybdenite (molybdenum disulfide). These dry ingredients were mixed for about five minutes and then for an additional five minutes with 5 parts, by weight, based on the total weight of the batch, of tempering fluid. The tempering fluid used was a lignin liquor and water mixture in about a 1 to 3 weight ratio. A similar batch, without the molybdenite addition, was prepared as a control. The batches were formed into brick at 8000 p.s.i. The molybdenite-magnesite batch brick had a bulk density of 185 lb. per cu. ft.

The brick were placed in a furnace and heated to 1500° F. The furnace temperature was held for 30 hours. At the end of the 30 hours, load was applied to the brick. The control brick had a modulus of rupture of 190 p.s.i. The molybdenite-magnesite brick had a 740 p.s.i. modulus of rupture.

*Example II*

A size graded magnesite brick batch of the type discussed under Example I above was prepared, and 99.5 parts, by weight, thereof was mixed with 0.5 part, by weight, of molybdenite. The mixing was conducted in the same manner as that discussed above. The brick were pressed at 8000 p.s.i., and had a density at the press of 180 lb. per cu. ft. The brick were placed in a furnace and heated to 1500° F. The furnace temperature was held for 30 hours. At the end of 30 hours, load was applied to the brick. The modulus of rupture of the brick was 410 p.s.i. This established that very small amounts of molybdenite resulted in a considerable improvement in intermediate strength.

*Example III*

The molybdenite addition is useful in unburned, chemically bonded, magnesite-chrome and chrome-magnesite brick, as well as straight magnesite brick. For example, an exemplary magnesite-chrome brick batch is as follows: 60 parts magnesite and 40 parts Philippine chrome ore. A typical screen analysis of the mix is as follows: about 20% held on 10 mesh, about 30% passing 10 mesh and held on a 28 mesh screen, about 10% passing a 28 mesh screen and held on a 65 mesh screen, and about 40% passing a 65 mesh screen. Of that fraction passing a 65 mesh screen, a major portion (over 50%) passes a 150 mesh screen. It is preferred that substantially all of the chrome ore be held on a 28 mesh screen. The magnesite preferably constitutes substantially all of the —28 mesh fraction. A usable magnesite has the same chemical analysis as that set forth under Example I above. A typical analysis, by weight and on the basis of an oxide analysis, of Philippine chrome ore is as follows: 32% $Cr_2O_3$, 30% $Al_2O_3$, 19% MgO, 6% $SiO_2$, 12% FeO, the remainder (by difference) CaO and loss on ignition. An addition of about 1 part, by weight, of molybdenite to the foregoing mixture results in increased green density and considerably improved strength at 1500° F.

*Example IV*

Another usable brick batch mixture according to the invention is comprised of about 5 parts, by weight, of molybdenite and about 95 parts, by weight, of the size graded magnesite of Example I. Such a brick batch has a somewhat decreased bulk density at the press because of the increased amount of molybdenite; but has a considerably improved modulus of rupture after cooling from 1500° F.—as compared to the control mix discussed under Example I above.

From the foregoing, it is clear that small amounts of molydenite improve the low and intermediate temperature strength of unburned basic refractory brick. The upper limit of the molybdenite addition is variable and depends, for example, on the service environment in which the brick are to be placed, the relative increase in cost represented by the molybdenite additions, etc. In general, I do not suggest more than a 10%, by weight, addition of molybdenite to a brick batch. Preferably, the addition will constitute less than 5%, by weight, of the batch.

The molybdenite used in the foregoing examples may be physically characterized as platy and finely divided, i.e. —65 mesh. While the full extent of the action of the platy particles of molybdenite is not fully understood, they do appear to have a definite lubricating effect during the pressing of refractory shapes. It may be that the molybdenite plates served as a means to allow easy movement of the fine particles of size graded brick batches, to provide a much denser compaction thereof through the interstices between coarser particles.

Preferable size grading for the brick batches have been presented herein. It should be understood that the mesh sizes given are desired, but there may be variation therefrom while still deriving benefit from the addition of minor amounts of molybdenite. For example, ±5%, by weight, of any of the various size graded fractions would still provide satisfactory brick batches.

In the foregoing discussion, all mesh sizes are according to the Tyler series. Also, all parts and percents are by weight. The chemical analysis of all materials are on the basis of an oxide analysis, in conformity with the common practice in reporting the chemical content of refractory materials. The various chemical constituents are reported as though they were present as the simple oxides. For silicon would be reported as silicon dioxide. Technical grade molybdenite was used in the foregoing examples.

It should be understood that relatively purer or less expensive commercial grades of molybdenite can also be used.

Having thus described the invention in detail and with sufficient particularity as to enable those skilled in the art to practice it, what is desired to have protected by Letters Patent is set forth in the following claims.

I claim:

1. In unburned, size graded, basic refractory batches, the improvement which comprises about 0.5 to 10%, by weight, of molybdenite in the batch to provide improved intermediate temperature strength in shapes made from the batch.

2. The batch of claim 1 in which about 0.5 to 5%, by weight, of molybdenite is in the batch.

3. The batch of claim 1 in which the basic refractory batch is substantially entirely magnesite.

4. The refractory batch of claim 1 in which the size graded basic refractory batch is substantially entirely a mixture of chrome ore and magnesite.

5. The refractory batch of claim 4 in which substantially all of the chrome ore is +28 mesh.

6. The refractory batch of claim 1 in which up to about 40% of the batch passes a 65 mesh screen and a major portion thereof passes a 150 mesh screen.

References Cited by the Examiner

UNITED STATES PATENTS 2,283,250　5/42　Goldschmidt _____ 106—59

OTHER REFERENCES

The Condensed Chemical Dictionary, Reinhold Pub. Corp., New York, 6th edition, 1961, page 761.

TOBIAS E. LEVOW, *Primary Examiner.*